United States Patent [19]

Inoue et al.

[11] Patent Number: 4,558,977

[45] Date of Patent: Dec. 17, 1985

[54] NC METHOD AND SYSTEM FOR MACHINING A 3D CONTOUR IN A WORKPIECE

[75] Inventors: Kiyoshi Inoue, Tokyo; Akihiko Shimizu, Kawasaki; Jinzo Yabe, Yokohama, all of Japan

[73] Assignees: Inoue-Japax Research Incorporated; Japax Incorporated, both of Kanagawa, Japan

[21] Appl. No.: 421,042

[22] Filed: Sep. 21, 1982

[30] Foreign Application Priority Data

Sep. 21, 1981 [JP] Japan ................................ 56-147919

[51] Int. Cl.[4] .................... B23Q 33/00; G05B 19/00; G06F 15/46
[52] U.S. Cl. .................................... 409/80; 318/572; 364/474
[58] Field of Search ........................ 409/80; 364/474; 318/570, 572, 574, 571

[56] References Cited

U.S. PATENT DOCUMENTS

| | | | |
|---|---|---|---|
| 3,270,186 | 8/1966 | Centner | 318/572 |
| 3,430,035 | 2/1969 | Read | 318/572 X |
| 3,609,320 | 9/1971 | Tripp | 318/572 X |
| 3,866,027 | 2/1975 | Cutler et al. | 318/572 |
| 4,035,706 | 7/1977 | Cutler | 318/572 |

FOREIGN PATENT DOCUMENTS

| | | | |
|---|---|---|---|
| 53-40174 | 4/1978 | Japan | 409/80 |
| 55-48563 | 4/1980 | Japan | 409/80 |
| 1010293 | 11/1965 | United Kingdom | 409/80 |
| 1072083 | 6/1967 | United Kingdom | 409/80 |
| 1299890 | 12/1972 | United Kingdom | 409/80 |
| 1424767 | 2/1976 | United Kingdom | 409/80 |

Primary Examiner—William R. Briggs
Attorney, Agent, or Firm—Karl F. Ross; Herbert Dubno

[57] ABSTRACT

A numerical-control (NC) method and system for machining a desired three-dimensional contour in a workpiece with an axial tool, e.g. a rotary milling cutter or electroerosion electrode, formed at its axial end with an active machining surface which is spherical about a center intersected by the axis of the tool. According to the invention, numerical coordinate values for the positions of this center of the tool to be displaced relative to the workpiece need not to be preprogrammed and stored on a record medium. Rather, the numerical coordinate values for a series of prescribed points on the desired contour, together with the angular values defining an imaginary line normal to the contour at each of these points are simply programmed and stored on such an NC tape or like medium, and a numerical datum for a constant value substantially equal to the radius of the sphere is keyed in into a computing device arranged between a tape reader and drive units for computing from the data reproduced from the NC tape and the keyed-in datum, for each of the prescribed points, the three-dimensional coordinate values of the position of the center of the sphere. The computing device is associated with a drive control unit for producing from the computed numerical coordinate values, command signals to operate the drive units so that the workpiece and the tool are relatively displaced to allow the desired contour to be progressively developed in the workpiece.

10 Claims, 10 Drawing Figures

NC METHOD AND SYSTEM FOR MACHINING A 3D CONTOUR IN A WORKPIECE

FIELD OF THE INVENTION

The present invention relates to the machining of a contour in a workpiece and, more particularly, to a new and improved numerically controlled (NC) method of and system for machining a desired three-dimensional contour in a workpiece with an axial tool having at its end an effective machining surface which is substantially spherical in shape.

BACKGROUND OF THE INVENTION

In machining a three-dimensional contour in a workpiece, it has been common to employ a rotary milling tool which in rotation provides at its axial end a rotating cutting surface. The rotating milling tool and the workpiece are brought into and held in substantial tangential contact while they are relatively displaced translationally in a predetermined three-dimensional coordinate system to progressively develop the machined contour in the workpiece. The path of translational relative displacement between the milling tool and the workpiece determines the eventual machined contour which is generally dissimilar in shape to the rotary cutting edge of the tool.

A desired three-dimensional contour which may be intricate in shape can also be produced in a workpiece by an electroerosion process. While to this end it has long been the common practice to employ a tool electrode with a preformed or machined shape complementary to the desired contour so that the tool electrode can be axially advanced to produce the desired machined contour in the workpiece, it has also been proposed to utilize a simple or "generic" electrode tool which is dissimilar in shape to the desired three-dimensional contour. In this latter case, as in the mechanical milling process, the electrode tool and the workpiece need to be relatively displaced translationally in a predetermined multi-axial coordinate system while they are held in a close proximity relationship across the machining gap flooded with an electroerosion fluid medium. The electrode tool may be either rotational or non-rotational.

In both the milling and electroerosion processes described, it is the prime interest of industry to achieve the required relative displacement between the tool and the workpiece automatically by having resort to a numerical control (NC) system. In NC systems, numerical values corresponding to desired positions of tools are stored on record media such as punched paper tapers, punched cards or magnetic tapes so that they can be used to control the operation automatically.

For the three-dimensional machining processes described to be achieved automatically under numerical control, there must be determined a certain fixed point in the tool for its controlled displacement relative to the workpiece. It is practically necessary to locate such a reference point on the axis of the tool, that is the rotary axis of a reference milling cutter, or the axis of a rotary electroerosion tool electrode or of a non-rotary axially symmetrical electroerosion tool electrode. It is beneficial for NC purposes that the rotating milling or electroerosion tool provides an effective machining surface which is symmetrical about the rotary axis and assumes a body of revolution. Likewise, a non-rotary electroerosion tool should practically be of a shape of body of revolution and axially be symmetrical so that the reference point can be located on the tool axis. Then, since the desired contour to be machined in the workpiece is known, a number of points to be successively followed by substantial tangential contact between the tool and the workpiece can, in a predetermined three-dimensional coordinate system, be prelocated on the desired contour and the three-dimensional-coordinates of each of the positions for the reference point on the tool axis corresponding to each tangential contact point can be calculated from the three-dimensional coordinates of the latter when the curvature of the machining surface on each such tangential contact point is known. In general, the curvature varies from point to point as a function of the distance between the reference point in the tool and the point of tangential contact on the tool machining surface.

Accordingly, after establishing in a given three-dimensional coordinate system a prescribed number of points lying on a given machining path which the effective machining surface of the tool needs to follow while maintaining its substantial tangential contact with the workpiece to progressively develop the desired contour therein, it has been the common practice in the prior NC machining art to entail, prior to the actual machining operation, the step of individually computing from the three-dimensional coordinates of each given point on the machining path, the three-dimensional coordinates of the corresponding position for the reference point on the tool axis whereupon the data for all the individually computed three-dimensional coordinates of the reference positions needs to be stored on a memory medium so that they can be reproduced in the actual machining operation for relatively displacing the tool and the workpiece along the prescribed machining path. It will be apparent that this pre-machining procedure is a complicated, time-consuming and laborious programming or preprogramming task. The difficulties become multiplied where two or more separate record storages (e.g. punched tapes) should be prepared as are most often necessary to machine the workpiece in rough and finish in a number of steps to reach the eventual precision and finished-surface contour. Where such multiple machining operations are required, respective independent steps of computation to obtain the three-dimensional coordinates of the reference point are necessary for separate tools which are similar but different in size and the computed coordinate data must be stored in separate record media (e.g. punched tapes).

OBJECTS OF THE INVENTION

It is accordingly an important object of the present invention to provide an improved and highly efficient method of machining a desired three-dimensional contour in a workpiece.

Another object of the present invention is to provide a novel three-dimensional contour-machining method whereby a high-precision and excellent surface-quality machined contour is obtained utilizing multiple successive machining steps but with numerical-control procedures much simplified over the prior art, or eliminating the need for separate computation and storage, for such successive machining steps, of numerical values corresponding to the desired position for the reference point relative to the workpiece.

A further object of the present invention is to provide an improved system for carrying out the methods described.

SUMMARY OF THE INVENTION

The present invention employs an axial tool having its active tool end adapted to provide an effective machining surface which is spherical in shape, or a plurality of axial tools adapted to provide such effective machining surfaces, respectively, which have spheres of different radii. It should be understood that the term "sphere" is intended to mean not only a complete sphere but a portion of a sphere such as a hemisphere. Likewise, the adjective "spherical" should be understood not only as an adjective for a complete sphere but as an adjective for a partial sphere such as a hemisphere.

The present invention further makes use of the fact that given any point (hereinafter referred to as "machining point") on the desired contour or a path (hereinafter referred to as "machining path) along which the effective spherical machining surface of the axial tool is required to be three-dimensionally displaced relative to the workpiece to progressively develop the desired contour in the workpiece, the reference point on the axis of the tool to be displaced relative to the workpiece can be fixedly located at the center of the sphere constituting the effective machining surface irrespective of the position of the machining point and the reference point or the center lies on the normal to the machining point. Thus, the three-dimensional coordinates of the reference point can readily be obtained from the three-dimensional coordinates of the machining point and the orientation or the angular coordinates defining the normal to the machining point, once the radius is determined which is always constant for a given machining operation or once the tool of the present invention is given. Thus, only the numerical values corresponding to successive prescribed machining points or positions together with the numerical values corresponding to the respective normal to those machining points need be stored on a memory medium (e.g. a punched tape) and, since the radius of the effective spherical machining surface of the tool is a fixed value, it can only be keyed in or can only be used as a key-in parameter into a computer in a computerized numerical control (CNC) device. Thus, the present invention eliminates the conventional need for storing on a record medium (e.g. a tape) the numerical values for the desired positions of the reference point on the tool axis, and hence eliminates the conventional need therefor for the precomputation of those numerical values.

Thus, even where the desired three-dimensional contour is to be machined entailing two or more machining steps (e.g. roughing and finishing), only a single stored memory medium (e.g. a single punched tape) that stores the numerical values of the successive prescribed machining points on the effective tool machining surface, coupled respectively with the numerical values for the normals to those machining points need to be prepared. In each actual machining step (e.g. roughing and finish-machining steps), the fixed radius of a respective spherical effective tool machining surface only needs to be keyed in to allow the three-dimensional coordinates of the center or reference point on the tool axis to be computed on a real-time basis.

In accordance with the present invention there is thus provided, in a first aspect thereof, a numerically controlled method of machining a desired three-dimensional contour in a workpiece, which method comprises the steps of: (a) preparing an axial tool formed at its end with an effective machining surface which is substantially spherical about a center intersected by the axis of the tool; (b) prescribing a series of points on the desired contour to be machined in the workpiece; (c) identifying each of the prescribed points in terms of its coordinate values in a predetermined three-dimensional coordinate system and of angular values defining the orientation of a normal thereat to the desired contour; (d) storing on a record medium data for the identified coordinate values and angular values sequentially for the successive prescribed points; (e) supporting the tool and the workpiece so that they can be dispalced relative to each other by drive means along the three axes of the predetermined three-dimensional coordinate system; (f) electrically connecting the drive means with data processing means so that the former can be controlledly operated by the latter; (g) inputting into said data processing means a numerical datum for a constant value substantially equal to the radius of the sphere at least a portion of which constitutes the said effective machining surface; (h) reproducing from the stored record medium, data for the said three-dimensional coordinate values and angular values of each of the said successive prescribed points on the desired contour by means of read-out means operably connected with the data processing means; (i) in the data processing means, computing from the said reproduced data and the said inputted datum, for each of the said prescribed points, the three-dimensional coordinate values of the position of the said center of the sphere; and (j) producing from the computed numerical coordinate values, command signals to operate said drive means whereby the workpiece and the said center in the tool are relatively displaced along a path defined by a series of the said positions to allow the desired contour to be progressively developed in the workpiece.

The effective machining surface of the tool may be substantially hemispherical in shape. The tool may be a rotary tool. The spherical or hemispherical effective machining surface may be formed upon rotation of the tool about the rotary axis. The tool may be a milling tool or an electroerosion electrode tool.

With the milling tool, in step (g), the constant value may be precisely equal to the radius of the sphere. The tool may also be an electroerosion electrode tool to be displaced relative to the workpiece while maintaining a small electroerosion gap spacing therebetween. Then in step (g), the constant value should be equal to the sum of the radius of the sphere and the gap spacing.

In the method described, the tool may be a finish-machining tool for use to remove a layer of stock of a prescribed thicnkess from the workpiece to produce the desired contour therein. In this case, the method described further comprises, prior to step (g) and subsequent to step (f), the step of rough-machining the workpiece with a rough-machining tool having an effective machining surface which is similar in shape to that of the finish-machining tool but has a radius of sphere greater than that of the finish-machining tool. The rough-machining step comprises: (go) inputting into the data processing means a numerical datum for a constant value which is substantially equal to the sum of the said greater radius and the said thickness; (ho) the same as step (h), (io) in the data processing means, computing from the data reproduced in step (ho) and the datum inputted in step (go), for each of the prescribed points, the three-dimensional coordinate values of the position of the center of the sphere of the greater radius; and (jo) producing from the numerical coordinate values computed in step (io), command signals to operate the drive means whereby the workpiece and the center in the rough-machining tool are relatively displaced along a path defined by a series of such positions as mentioned in step (io) to allow a rough-machined contour which is similar to the said desired contour to be progressively developed in the workpiece.

In the case of electroerosion, with the rough-machining tool being a rough-machining electroerosion electrode tool, the numerical value inputted into the data processing means in step (go) should be for the constant value which is equal to be the sum of the said greater radius, a prescribed electroerosion gap spacing and the said thickness.

Preferably in step (i) and/or step (io) of the method described, the three-dimensional coordinate values of the position of the said center corresponding to any of the successive prescribed points are computed from the three-dimensional coordinate values of the position of the said center corresponding to, and said reproduced data for, the immediately preceding prescribed point, and said inputted datum.

The invention also provides, in a second aspect thereof, a numerical-control system for machining a desired contour in a workpiece, which system comprises: (a) an axial tool formed at its axial end with an effective machining surface which is substantially spherical about a center intersected by the axis of the tool; (b) datum sheet means for identifying a series of points prescribed on the desired contour to be machined in the workpiece, each of the prescribed points being identified in terms of its coordinate values in a predetermined three-dimensional coordinate system and of angular values defining the orientation of a normal thereat to the desired contour; (c) programming means for storing from the datum sheet on a record medium, data for the said identified coordinate values and angular values sequentially for the successive prescribed points; (d) means for supporting the tool and the workpiece so that they can be displaced relative to each other by drive means along the three axes of the predetermined three-dimensional coordinate system; (e) data processing means operably connected with said drive means via drive control means; (f) means for inputting into the data processing means a numerical datum for a constant value substantially equal to the radius of the sphere at least a portion of which constitutes the said effective machining surface; (g) read-out means for reading out the said stored record medium to reproduce data for the said three-dimensional values and angular values of each of the said successive prescribed points on the desired contour; (h) means in the said data processing means for computing from the said reproduced data and the said inputted datum, for each of the prescribed points, the three-dimensional coordinate values of the position of the center of the said sphere; and (i) the said drive control means for producing from the computed numerical coordinate values, command signals to operate the said drive means whereby the workpiece and the said center in the tool are relatively displaced along a path defined by a series of the said positions to allow the desired contour to be progressively developed in the workpiece.

BRIEF DESCRIPTION OF THE DRAWING

These and other features and advantages of the present invention will become more readily apparent from a reading of the following description of certain embodiments thereof with reference to the accompanying drawing in which.

SPECIFIC DESCRIPTION

Figure 1A:
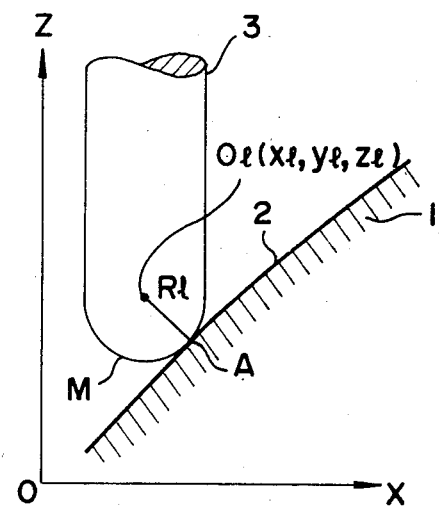
FIGS. 1(a), 1(b), 1(c) and 1(d) each show a tool in machining a three-dimensional contour in a workpiece.
Figure 1B:
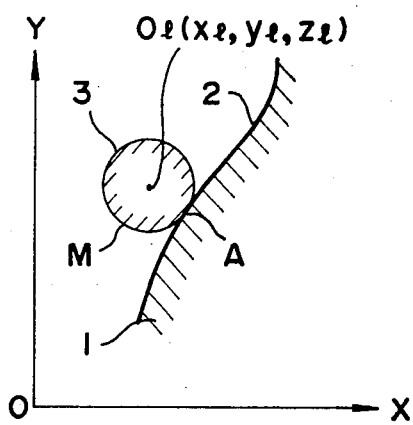
Figure 1C:
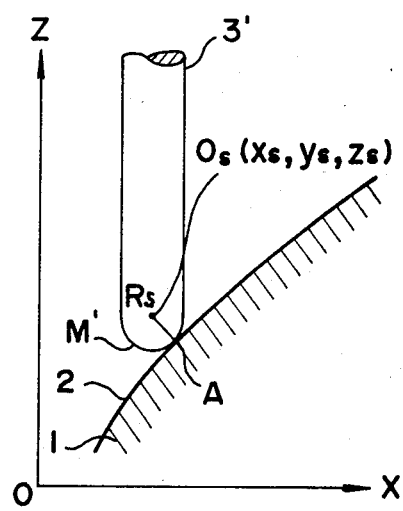
Figure 1D:
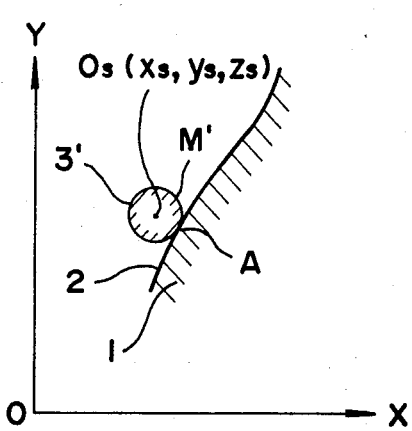

Referring to FIGS. 1(a)–1(d), the present invention for machining a workpiece 1 to produce a three-dimensional contour 2 therein employs an axial tool 3, 3'. In FIGS. 1(a) and 1(c), a projection of a portion of the three-dimensional contour 2 on a Z-X plane of a three-dimensional orthogonal coordinate system is shown. In FIGS. 1(b) and 1(d), a projection of the portion 2 on an X-Y plane of the three-dimensional orthogonal coordinate system is shown. The axial tool 3, 3' shown has at its axial end an effective hemispherical machining surface M, M' which is shown in tangential contact with the workpiece 1 at a machining point A on a machining path which here coincides with the three-dimensional contour 2 to be progressively developed in the workpiece 1. The tool 3 shown in FIGS. 1(a) and 1(b) has its hemispherical machining surface M having a greater radius Rl while the tool 3' shown in FIGS. 1(c) and 1(d) has its semi-spherical machining surface having a smaller radius Rs. The tools 3 and 3' are designed for use in rough- and finish-machining the contour 2, respectively. The centers of the hemispheres constituting the effective machining surface M, M' of the rough- and finishing tools 3 and 3' are designated at Ol and Os, respectively. It is seen that given any common machining point A, the position of the centers Ol and Os are different and have different coordinates: (Xl, Yl, Zl) and (Xs, Ys, Zs). It is for this reason that two separate stored record media (e.g. punched tapes), according to the prior practice, have to be prepared individually for the respective positions of the reference points Ol and Os, entailing time-consuming and laborious programming and tape-punching procedures.

Figure 2A:
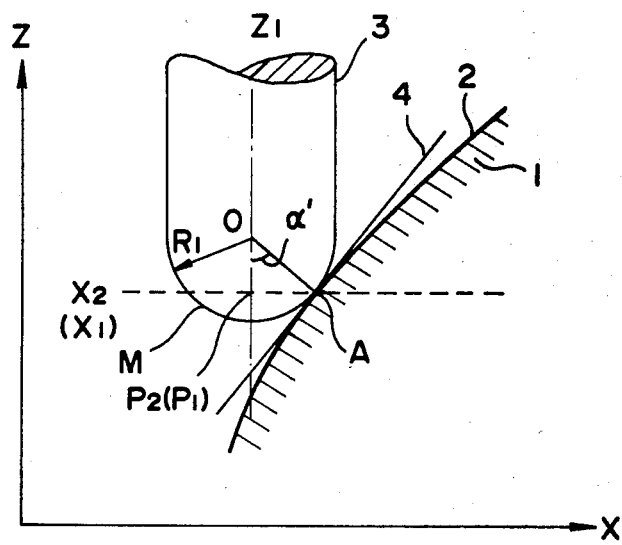
FIGS. 2(a), 2(b) and 3 show a relationship between the three-dimensional coordinates of a machining point and the three-dimensional coordinates of the position of the center corresponding thereto.
Figure 2B:
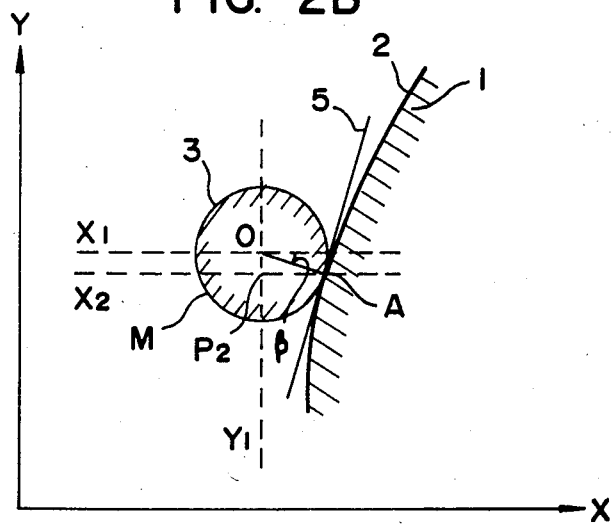
Figure 3:
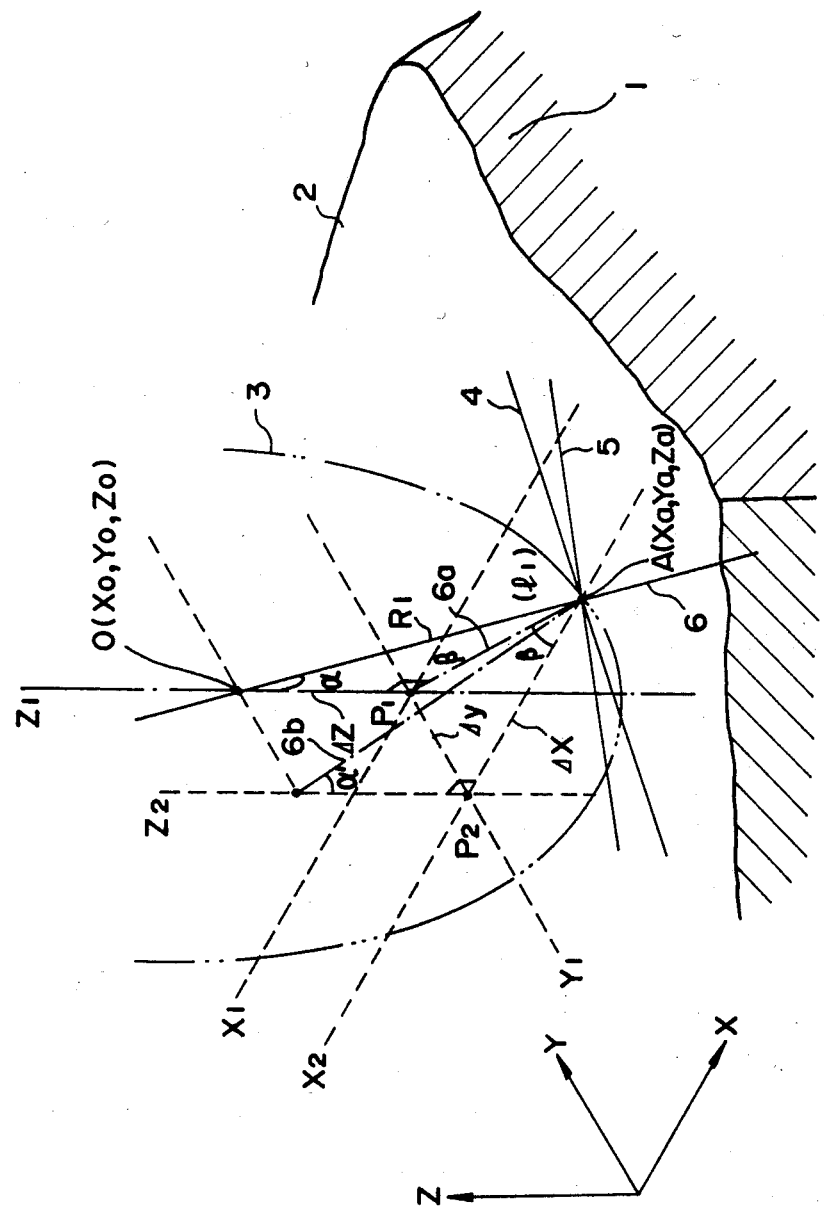
Figure 4A:
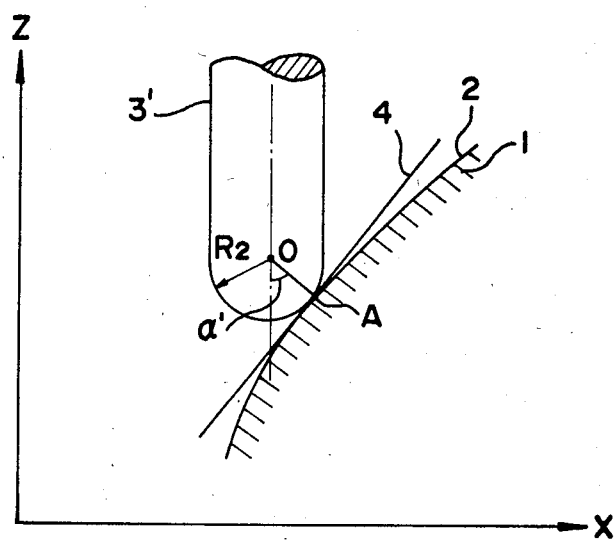
FIGS. 4(a) and 4(b) show a rough-machining tool in rough-machining a workpiece compared with a finish-machining tool in finish-machining the workpiece as shown in FIGS. 2(a) and 2(b)
Figure 4B:
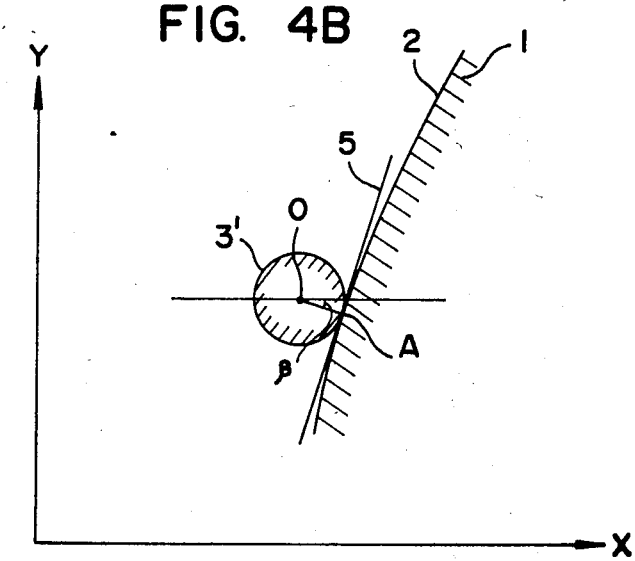

The present invention will now be described with reference to FIGS. 2A through 5. FIGS. 2A, 2B and 3 show a relationship between the three-dimensional coordinate of the position of a machining point A and the three-dimensional coordinates of the position of the center O corresponding thereto. In FIG. 2A the line 4 designates the tangent at the point A to the contour 2 or the machining path projected on the Z-X plane. In FIG. 2B the line 5 designates the tangent at the point A or the machining path projected on the X-Y plane. The normal at the machining point A to the contour 2 or the machining path, that is the line which is normal at the point A to the tangents 4 and 5 is designated at 6 in FIG. 3, the normal passing through the center O of the semi-sphere M on the axis of the tool 3. Assuming that the center O lies at the coordinates (Xo, Yo, Zo) and the machining point A lies at the coordinates (Xa, Ya, Za), we can obtain the following formula:

$$Xo = Xa - \Delta X \quad (1)$$
$$= Xa - l1 \cos\beta$$
$$= Xa - R1\sin\alpha \cos\beta$$
$$Yo = Ya + \Delta Y \quad (2)$$
$$= Ya + l1\sin\beta$$
$$= Ya + R1\sin\alpha \sin\beta$$
$$Zo = Za + \Delta Z \quad (3)$$
$$= Za + R1\cos\alpha$$

where:

R1 is the radius of the semi-sphere M,

α is the angle defined by the normal 6 with the axis Z1 of the tool 3,

β is the angle defined by the projection of the normal 6 on the X-Y plane and the X-axis, that is the angle defined by the perpendicular 6a from the machining point A on the axis Z1 with the line X1 which is parallel with the X-axis and passes through the point of intersection P1, l1 is the distance between the machining point A and the point of intersection P1, ΔX is the X-axis component of the distance between the machining point A and the center O, that is the distance between the machining point and the point P2 of intersection of the line X2 which is parallel with the X-axis and passes through the machining point A with the line Y1 which is parallel with the Y-axis and passes through the point of intersection, ΔY is the Y-axis component of the distance between the machining point A and the center O, that is the distance between the points of intersection P1 and P2, and ΔZ is the Z-axis component of the distance between the machining point A and the center O, that is the distance between the center O and the point of intersection P1.

Further, α' shown in FIG. 3 is the angle defined by the projection 6b on the Z-X plane of the normal 6' with the line Z2 which is parallel with the Z-axis and passes through the point P2. It will be apparent that there is no dependency of the angles α(α') and β on the radius R1; the formulae (1) through (3) equally stand for a change of the radius R1, e.g. of the rough-machining tool 3 of FIG. 2 to the radius R2, e.g. smaller and of the finish-machining tool 3' of FIGS. 4A and 4B.

Accordingly it has now been recognized that only the numerical values corresponding to the five axial coordinates Xa, Ya, Za, α and β for successive machining points A can be stored on a record medium for read-out in the stage of an actual machining operation. In the latter stage, a numerical value for the radius R is keyed in and the stored numerical information is read out from the record medium. The stored numerical values can be successively read out for successive machining points and, subjected to computation by a computer or data processing device with the formula (1), (2) and (3) programmed and the constant R keyed therein to determine the three-dimensional coordinates of each of the successive positions for the center O (Xo, Yo, Zo) of the semi-sphere constituting the effective machining surface M of the tool 3.

Figure 5:
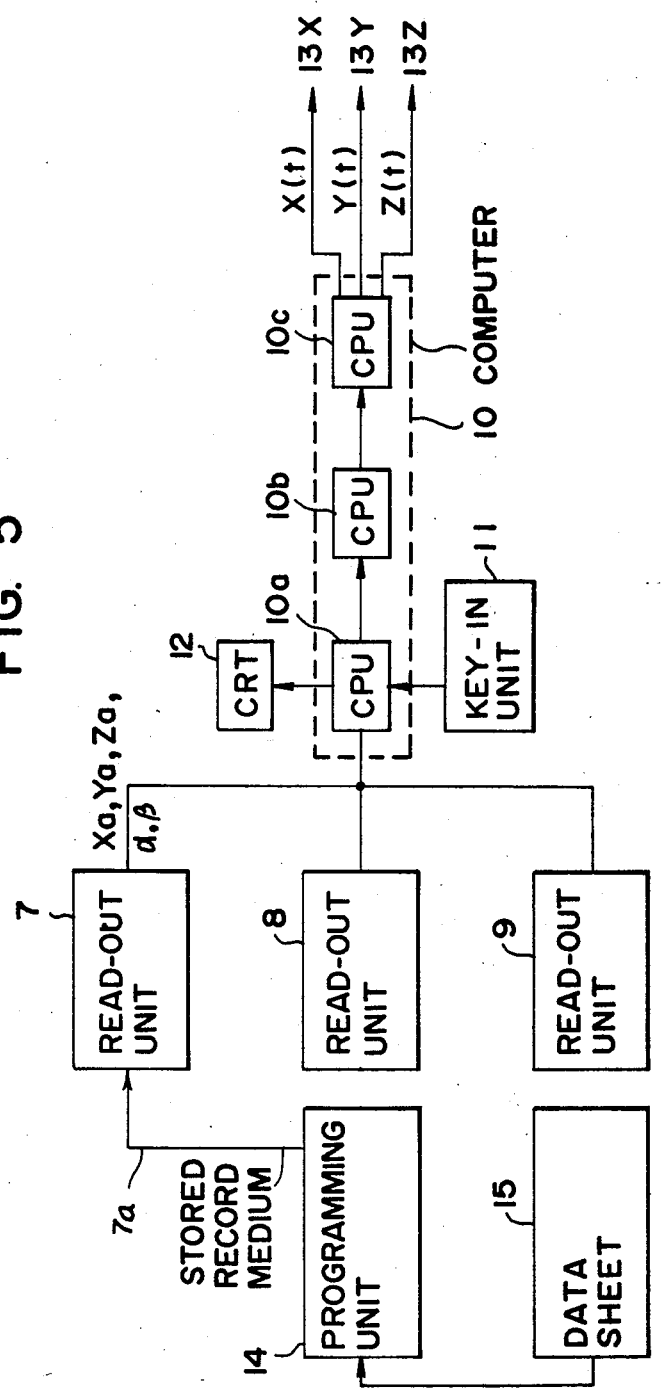
FIG. 5 diagrammatically shows a system according to the present invention.

FIG. 5 shows a block diagram for carrying out the method according to the present invention. The diagram includes a tape reader 7 for reading out a punched tape 7a having the numerical values corresponding to the variables Xa, Ya, Za, α and β stored therein for successive machining points A. A second reader 8 is provided to read out a magnetic tape having a computation program stored therein for the formula (1) to (3). A third reader 9 reads out a magnetic bubble memory having a possible further computation constant or constants stored therein. The outputs of the readers 7, 8 and 9 are shown as being fed into a computing device 10 which includes three central processing units (cpu) 10a, 10b and 10c. The first cpu 10a of the computing device 10 is designed to process the incoming input data and equipped with a key-in unit 11 and a cathode-ray tube (CRT) display 12 so that the key-in value for the radius R inputted by the unit 11 and the numerical coordinate values for the machining point A can be displayed on the unit 12. The second cpu 10b is operable responsive to the first cpu 10a to compute the coordinate values X(t), Y(t) and Z(t) of the center O of the machining surface M from the inputted data in a manner as will be described. The third cpu 10c is provided to process the computed coordinate values and to produce drive commands which are distributed and applied to three actuators or drive units 13X, 13Y and 13Z.

In operation, the first cpu 10a is fed from the reader 7 with numerical coordinate values $(X_i, Y_i, Z_i, \alpha_i, \beta_i)$ for one prescribed machining point $A_i$ and numerical coordinate values $(X_{i+1}, Y_{i+1}, Z_{i+1}, \alpha_{i+1}, \beta_{i+1})$ for the subsequent prescribed machining point $A_{i+1}$ to compute a difference in each of the coordinate components X, Y, Z, α and β between the two successive machining points $A_{i+1}$ and $A_i$ as follows:

$$Xd = X_{i+1} - X_i \quad (4)$$

$$Yd = Y_{i+1} - Y_i \quad (5)$$

$$Zd = Z_{i+1} - Z_i \quad (6)$$

$$\alpha d = \alpha_{i+1} - \alpha_i \quad (7)$$
$$\beta d = \beta_{i+1} - \beta_i \quad (8)$$

Then, the second cpu 10b operates to compute, from these difference values, the coordinate values $(X_i, Y_i, Z_i, \alpha_i, \beta_i)$ for the machining point $A_i$, the value of radius R keyed by the unit 11 and the coefficient t which is designed to vary by increments from 0 to 1, the coordinate values X(t), Y(t) and Z(t) to be traveled by the center O from the position corresponding to the machining point $A_i(X_i, Y_i, Z_i)$ to the position corresponding to the machining point $A_{i+1}(X_{i+1}, Y_{i+1}, Z_{i+1})$ as follows:

$$X(t) = X_i + Xd \cdot t - R \sin(\alpha_i + \alpha d \cdot t) \cos(\beta_i + \beta d \cdot t) \quad (9)$$

$$Y(t) = Y_i + Yd \cdot t + R \sin(\alpha_i + \alpha d \cdot t) \sin(\beta_i + \beta d \cdot t) \quad (10)$$

$$Z(t) = Z_i + Zd \cdot t + R \cos(\alpha_i + \alpha d \cdot t) \quad (11)$$

In the formulae (9) to (11), with t=0, the position (X(0), Y(0), Z(0)) represents the position of the center corresponding to the initial position $A_i$ of machining point A and with t=1, the position (X(1), Y(1), Z(1)) represents the position of the center corresponding to the next position $A_{i+1}$ of machining point A.

If the distance to be traveled from the position with t=0 to the position with t=1 is set to be 1 mm, the increment of displacement can be set to be 1 μm when the width for t is equally divided into one thousand increments. Likewise, the increment of displacement can be set to be 10 μm when the width for t is equally divided into one hundred increments. The cpu 10b thus operates to successively compute the numerical coordinate values of each of such incrementally divided positions for the center O to be traveled while the machining point A is to shift from $A_i$ to $A_{i+1}$. Instructions for the incremental changes can be stored on the memory which is read out by the reader 9.

The third cpu 10c which is designed to serve as a drive control unit for the drive units 13X, 13Y and 13Z operates to convert the numerical values computed by the second cpu 10b into command signals to distribute drive pulses into the three actuators or drive units 13X, 13Y and 13Z which may each be a stepping motor, DC motor or AC motor. As will be apparent, it is also possible that the computed values from the cpu 10b or the cpu 10c can be used for storage to produce a new stored record medium (e.g. a punched tape).

In FIG. 5 there is also shown a programming unit 14, e.g. tape punching unit for preparing the NC tape 7a from a data sheet 15 which carries the identification of a series of the prescribed points A on the contour 2.

What is claimed is:

1. A numerically controlled method of machining a desired three-dimensional contour in a workpiece, comprising the steps of:
   (a) preparing an axial tool formed at its axial end with an effective machining surface which is substantially spherical about a center intersected by a axis of said tool;
   (b) prescribing a series of points on said desired contour to be machined in said workpiece;
   (c) identifying each of said prescribed points in terms of its coordinate values in a predetermined three-dimensional coordinate system and of angular values defining the orientation of a normal thereat to said desired contour;
   (d) storing on a record medium data for said identified coordinate values and angluar values sequentially for said successive prescribed points;
   (e) supporting said tool and said workpiece so that they can be translationally displaced relative to each other by drive means along the three axes of said predetermined three-dimensional coordinate system;
   (f) electrically connecting said drive means with data processing means so that the former can be controlledly operated by the latter;
   (g) inputting into said data processing means a numerical datum for a constant value substantially equal to the radius of a sphere at least a portion of which constitutes said effective machining surface;
   (h) reproducing from said stored record medium, data for said three-dimensional coordinate values and angular values of each of said successive prescribed points on the desired contour by means of read-out means operatively connected with said data processing means;
   (i) in said data processing means, computing from said reproduced data and said inputted datum, for each of said prescribed points, the three-dimensional coordinate values of the position of said center of said sphere; and
   (j) producing from said computed numerical coordinate values, command signals to operate said drive means whereby said workpiece and said center in said tool are relatively displaced translationally along a path defined be a series of said positions to allow said desired contour to be progressively developed in said workpiece.

2. The method defined in claim 1 wherein said effective machining surface is substantially semi-spherical in shape.

3. The method defined in claim 1 or claim 2 wherein said tool is a rotary tool.

4. The method defined in claim 3 wherein said effective machining surface is formed upon rotation of said tool about said axis.

5. The method defined in claim 1 wherein in step (g), said constant value is equal to the radius of said sphere.

6. The method defined in claim 1 wherein said tool is an electroerosion electrode tool to be displaced relative to said workpiece while maintaining a small electroerosion gap spacing therebetween, and in step (g) said constant value is equal to the sum of said radius of the sphere and said gap spacing.

7. The method defined in claim 1 wherein said tool is a finish-machining tool for use to remove a layer of stock of a prescribed thickness from the workpiece to produce the desired contour therein, the method further comprising, prior to step (g), the step of rough-machining the workpiece with a rough-machining tool having an effective spherical machining surface which is similar in shape to that of said finish-machining tool but has a radius of sphere greater than that of the finish-machining tool, the step of rough-machining comprising:
   (go) inputting into said data processing means a numerical datum for a constant value which is substantially equal to the sum of said greater radius and said thickness;
   (ho) the same as step (h);
   (io) in said data processing means, computing from said data reproduced in step (ho) and said datum inputted in step (go), for each of said prescribed points, the three-dimensional coordinate values of the position of the center of the sphere of said greater radius; and
   (jo) producing from said numerical coordinate values computed in step (io), command signals to operate said drive means whereby said workpiece and said center in said rough-machining tool are relatively displaced translationally along a path defined by a series of such positions as mentioned in step (io) to allow a rough-machined contour which is similar to said desired contour to be progressively developed in the workpiece.

8. The method defined in claim 7 wherein said rough-machining tool is an electroerosion electrode tool to be displaced relative to said workpiece while maintaining an electroerosion gap spacing therebetween, and in step (g) said constant value is equal to the sum of said greater radius, said gap spacing and said thickness.

9. The method defined in claim 1 or claim 7 wherein in step (i), said three-dimensional coordinate values of the position of said center corresponding to any of said successive prescribed points are computed from said three-dimensional coordinate values of the position of said center corresponding to, and said reproduced data for, the immediately preceding prescribed point, and said inputted datum.

10. A numerical-control system for machining a desired three-dimensional contour in a workpiece, comprising:
   (a) an axial tool formed at its axial end with an effective machining surface which is substantially spherical about a center intersected by an axis of said tool;

(b) datum sheet means for identifying a series of points prescribed on said desired contour to be machined in said workpiece, each of said prescribed points being identified in terms of its coordinate values in a predetermined three-dimensional coordinate system and of angular values defining the orientation of a normal thereat to said desired contour;

(c) programming means for storing from said datum sheet on a record medium, data for said identified coordinate values and angular values sequentially for said successive prescribed points;

(d) means for supporting said tool and said workpiece so that they can be translationally displaced relative to each other by drive means along the three axes of said predetermined three-diemsional coordinate system;

(e) data processing means operably connected with said drive means via drive control means;

(f) means for inputting into said data processing means a numerical datum for a constant value substantially equal to a radius of the sphere at least a portion of which constitutes said effective machining surface;

(g) read-out means for reading out said stored record medium to reproduce data for said three-dimensional values and angular values of each of said successive prescribed points on the desired contour;

(h) means in said data processing means for computing from said reproduced data and said inputted data, for each of said prescribed points, the three-dimensional coordinate values of the position of the center of said sphere; and (i) said drive control means for producing from said computed numerical coordinate values, command signals to operate said drive means whereby said workpiece and said center in said tool are relatively displaced translationally along a path defined by a series of said positions to allow said desired contour to be progressively developed in said workpiece.

* * * * *